(12) United States Patent
Wong et al.

(10) Patent No.: US 7,412,600 B2
(45) Date of Patent: Aug. 12, 2008

(54) APPROACHES FOR AUTOMATICALLY SWITCHING MESSAGE AUTHENTICATION KEYS

(75) Inventors: John C. Wong, Saratoga, CA (US); Anantha Ramaiah, Sunnyvale, CA (US); Amol Khare, Sunnyvale, CA (US); Mitesh Dalal, Santa Clara, CA (US); Shrirang Bage, Fremont, CA (US); Lin Han, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 11/261,683

(22) Filed: Oct. 28, 2005

(65) Prior Publication Data

US 2007/0101129 A1 May 3, 2007

(51) Int. Cl.
*H04L 29/00* (2006.01)
(52) U.S. Cl. .................................................... 713/160
(58) Field of Classification Search .................. 713/160
See application file for complete search history.

(56) References Cited

U.S. PATENT DOCUMENTS

| | | | | |
|---|---|---|---|---|
| 6,061,799 | A * | 5/2000 | Eldridge et al. | 726/20 |
| 6,502,192 | B1 * | 12/2002 | Nguyen | 726/4 |
| 7,100,054 | B2 * | 8/2006 | Wenisch et al. | 713/185 |
| 7,194,761 | B1 * | 3/2007 | Champagne | 726/6 |
| 2004/0034773 | A1 * | 2/2004 | Balabine et al. | 713/168 |
| 2005/0132214 | A1 * | 6/2005 | Naftali | 713/200 |
| 2005/0160478 | A1 * | 7/2005 | Ramaiah et al. | 726/14 |
| 2007/0005973 | A1 * | 1/2007 | Mynam et al. | 713/171 |
| 2007/0005985 | A1 * | 1/2007 | Eldar et al. | 713/183 |

OTHER PUBLICATIONS

R. Bonica, et al., "Authentication for TCP-based Routing and Management Protocols", draft-bonica-tcp-auth-00, Juniper Networks, TCPM Working Group Internet—Draft, Sep. 16, 2005.
R. Bonica, et al., "Authentication for TCP-based Routing and Management Protocols" draft-bonica-tcp-auth-01, Juniper Networks, TCPM Working Group Internet—Draft, Sep. 27, 2005.
R. Bonica, et al., "Authentication for TCP-based Routing and Management Protocols", draft-bonica-tcp-auth-02, Juniper Networks, TCPM Working Group Internet—Draft, Oct. 5, 2005.
A. Ramaiah, et al., "Key Rollover Schemes for TCP Connections Employing a Shared Key Model", Network Working Group Internet—Draft, Nov. 23, 2005.
R. Rivest, "The MD5 Message-Digest Algorithm", Network Working Group Request for Comments: 1321, Apr. 1992.

(Continued)

*Primary Examiner*—Matthew B Smithers
(74) *Attorney, Agent, or Firm*—Hickman Palermo Truong & Becker LLP

(57) ABSTRACT

Approaches are disclosed for switching transport protocol connection keys. A method of automatically changing a message authentication key at each of two endpoints of a connection in a telecommunications network comprises testing a sequence value received in each of a plurality of data segments on the connection; and selecting a next message authentication key, from among a plurality of stored message authentication keys, for use in authenticating subsequently received data segments, when the sequence value matches a specified characteristic.

32 Claims, 5 Drawing Sheets

OTHER PUBLICATIONS

Y. Rekhter, "A Border Gateway Protocol 4 (BGP-4)", Network Working Group Request for Comments: 1771, Mar. 1995.

F. Baker, et al., "RIP-2 MD5 Authentication", Network Working Group Request for Comments: 2082, Jan. 1997.

A. Heffernan, "Protection of BGP Sessions via the TCP MD5 Signature Option", Network Working Group Request for Comments: 2385, Aug. 1998.

F. Baker, et al., "RSVP Cryptographic Authentication", Network Working Group Request for Comments: 2747, Jan. 2000.

L. Andersson, et al., "LDP Specification", Network Working Group Request for Comments: 3036, Jan. 2001.

International Searching Authority, "Notification of Transmittal of the International Search Report and the Written Opinion of the International Searching Authority, or the Declaration", International application No. PCT/US06/40959, received Oct. 18, 2007, 11 pages.

Claims, International application No. PCT/US06/40959, 4 pages.

* cited by examiner

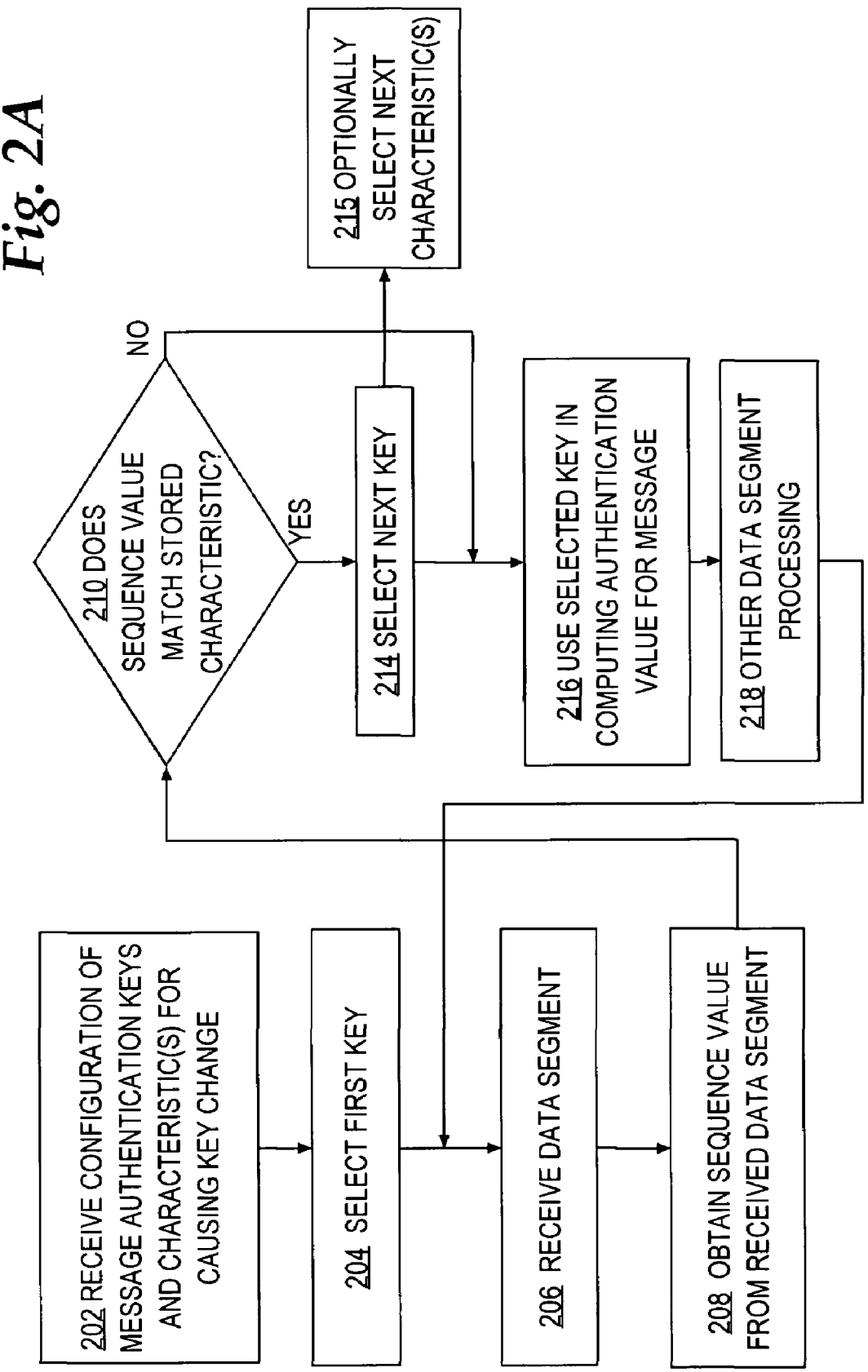

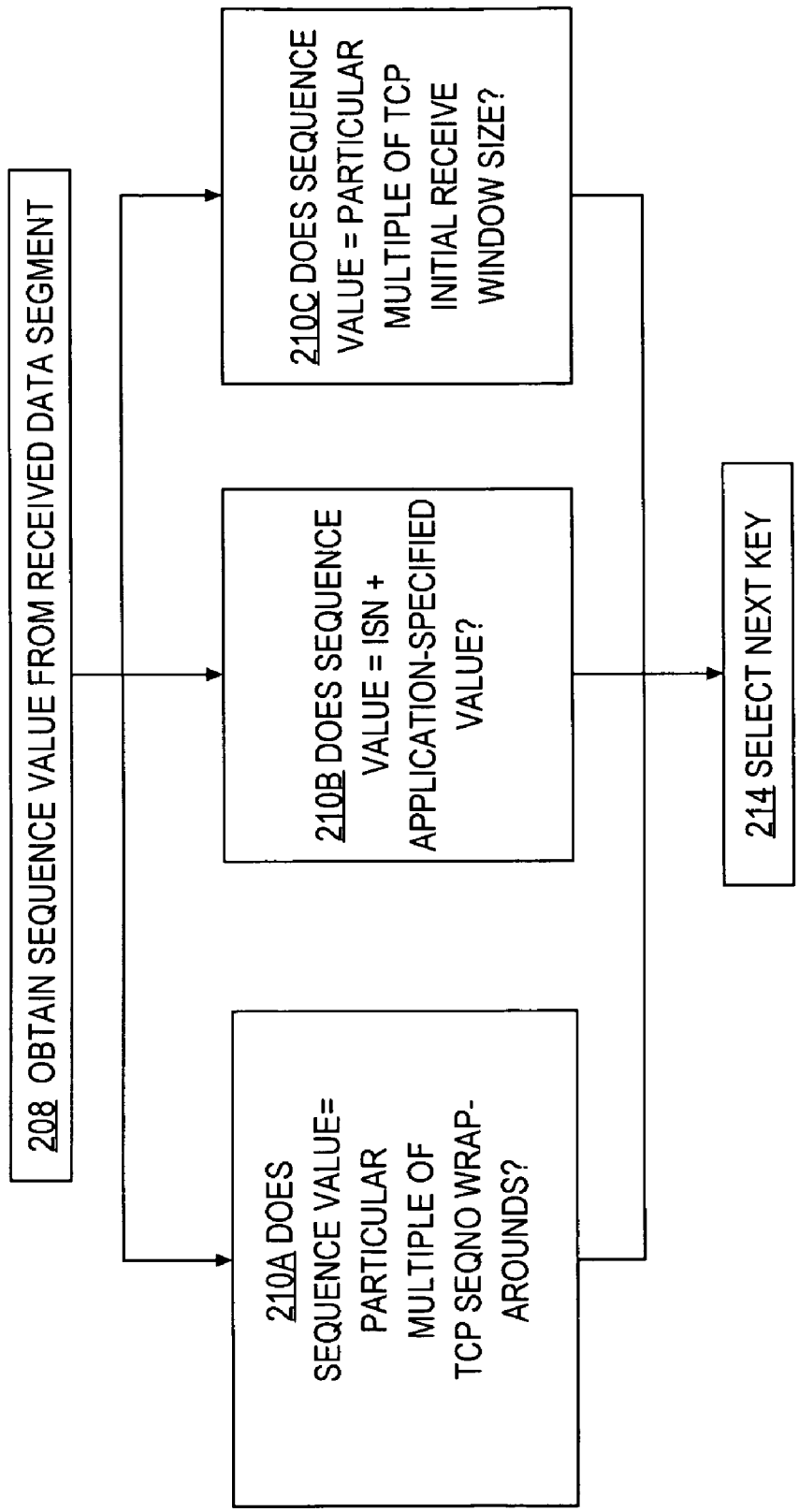

APPROACHES FOR AUTOMATICALLY SWITCHING MESSAGE AUTHENTICATION KEYS

CROSS-REFERENCE TO RELATED APPLICATIONS

The subject matter herein generally relates to the subject matter of prior U.S. application Ser. No. 11/173,690, filed Jul. 1, 2005, of Satish K. Mynam et al., entitled "Approaches for Switching Transport Protocol Connection Keys" ("Mynam et al. I") and the subject matter of U.S. application Ser. No. 11/329,509, filed on Jan. 10, 2006, of Satish K. Mynam et al., entitled "Approaches for Switching Transport Protocol Connection Keys" (Mynam et al. II).

FIELD OF THE INVENTION

The present invention generally relates to authenticating message communications. The invention relates more specifically to methods for changing the keys that are used to digitally sign transport protocol connections.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Transmission Control Protocol (TCP) is a transport layer protocol that provides a reliable connection-oriented data delivery service to upper-layer applications through the use of sequenced acknowledgment with retransmission of segments when necessary. In a typical TCP implementation, a TCP connection is established between two TCP endpoints that are established on two hosts. A TCP endpoint is maintained by the TCP module (or stack) of a host and is represented as the combination of an Internet Protocol (IP) address of the host and a TCP port number.

TCP uses a stream data transfer mechanism to deliver an unstructured stream of bytes between TCP endpoints. The bytes in the stream are numbered sequentially and are grouped into TCP segments for transmission over the TCP connection between the TCP endpoints. A TCP segment transmitted over a TCP connection includes a header portion and a payload portion, and can be identified by the sequence number of the first byte in the payload portion of the segment.

TCP sequence numbers are primarily used for flow control of data on the TCP connection. When a TCP connection is initially established, each endpoint generates a pseudo-random ISN (Initial Sequence Number). Each endpoint increments its ISN monotonically for each byte of data that the endpoint sends. The flow control mechanism also ensures reliable delivery by requiring the other endpoint to send an ACK (acknowledgment) for data received; each ACK identifies a received sequence number corresponding to successfully received data. The ACK mechanism ensures that the two TCP endpoints are constantly synchronized with respect to data transfer.

The transport service provided by TCP is used by upper-layer applications to exchange application-specific data over the TCP connection. One example of an upper-layer application that uses TCP to exchange data is Border Gateway Protocol (BGP). BGP is a peer-to-peer routing protocol the latest version of which, BGP-4, is defined in *RFC*1771 that was published by the Internet Engineering Task Force (IETF) in March 1995. In order to exchange routing information, two BGP hosts, or peers, first establish a TCP connection, and then negotiate a BGP session in order to exchange network routes. Another example of an upper-layer application that uses TCP to exchange data is Label Distribution Protocol (LDP). LDP is a protocol defined for the MultiProtocol Label Switching (MPLS) architecture and is described in *RFC*3036 published by IETF in January 2001. In a MPLS network, two Label Switching Routers (LSRs), or LDP peers, establish a bi-directional LDP session over a TCP connection in order to exchange label-mapping information that maps network layer routing information directly to data-link layer switched paths.

TCP, however, is vulnerable to data injection attacks. In a data injection attack, an attacker guesses parameter values for a valid TCP connection and uses these parameter values to send spurious TCP segments that contain malicious or spurious data payloads. These spurious TCP segments may affect the state of the TCP connection itself or may be intended for an upper-layer application. If the receiving TCP endpoint passes such segments to the upper-layer application various problems may occur when the application acts on or executes the data payloads. The consequences of data injection attacks can be severe. For example, when a BGP session is disrupted by a change in the state of the associated TCP connection, the BGP peers that established the session may have to discard all BGP routes that were exchanged during the session and may have to re-synchronize their routing information with peer routers in the network.

One type of a data injection attack is a to construct and send spurious TCP segments that request closing and re-setting of the TCP connection by setting the RST (reset) bit in the TCP segment's headers.

One prior approach for preventing such data injection attacks minimizes the chances that an attacker would be able to determine the parameters of a valid TCP connection. In this prior approach, a TCP endpoint computes a digital signature (or message digest or message authentication code) for each TCP segment that it sends, and includes the signature in the TCP segment header. The signature is computed based on a key or a password known only to both TCP endpoints, and uses the contents of one or more fields of the TCP segment as input. Thus, in order to successfully launch a data injection attack, an attacker would not only have to determine the valid TCP connection parameters, but would also have to guess the key or password used to produce the TCP segment signature.

One particular implementation of this prior approach, which is used for protecting BGP sessions, is described in *RFC*2385 published by IETF in August 1998. In this implementation, a TCP OPTION has been defined for carrying a Message-Digest5 (MD5) hash value in a TCP segment. The MD5 algorithm (as defined in *RFC*1321 published by IETF in April 1992) takes as input a message of arbitrary length and produces as output a 128-bit signature, or "message digest", of the input. In this implementation, every TCP segment sent on a TCP connection contains, in the OPTIONS field of the TCP segment header, a 16-byte MD5 signature produced by applying the MD5 algorithm to the following items in order:

1. The TCP segment pseudo-header (in the order: source IP address, destination IP address, zero-padded protocol number, and segment length);
2. The TCP segment header (excluding the OPTIONS field, and assuming a checksum of zero);
3. The TCP segment data (if any); and 4. An independently-specified key or password known to both TCP endpoints and presumably specific to the TCP connection.

Upon receiving a TCP segment signed with a MD5 signature, the receiving TCP endpoint computes its own digest for the TCP segment from same data and by using its own key. The receiving TCP endpoint then compares the computed digest with the MD5 signature included in the OPTIONS field of the TCP segment. If the computed digest matches the MD5 signature included in the TCP segment, the receiving TCP endpoint validates the TCP segment and passes the payload portion of segment to the recipient upper-layer application. If the comparison fails, the TCP endpoint silently discards the TCP segment and sends back no acknowledgement.

The above approach, however, has numerous disadvantages. One disadvantage of the above approach is that, although difficult, it may not be impossible for an attacker to produce a valid signature for a malicious TCP segment that it wants to inject in the TCP connection. For example, since the MD5 algorithm is prone to a successful cryptanalytic attack, it is not impossible for an attacker to sniff a large number of similar TCP segments and to deduce the key used to create the MD5 signatures for TCP segments. This disadvantage causes serious security concerns, especially for upper-layer applications, such as BGP, that use TCP connections to run sessions for very long periods of time.

Another disadvantage of the above approach is that in some situations it is very difficult to change the TCP connection keys without significant disruption to upper-layer applications. Since both TCP endpoints must use the same key to produce signatures for the TCP segments associated with a TCP connection, when the key associated with a TCP connection needs to be changed, both TCP endpoints must change the key nearly simultaneously in order to prevent loss of data transmitted between the upper-layer applications over the TCP connection.

For example, in a BGP implementation that is in accord with *RFC*2385, when BGP peers establish a BGP session with each other over a TCP connection, both BGP peers may configure their respective TCP endpoints to use a shared MD5 key or password. The shared MD5 key may be provisioned to the BGP peers beforehand. Some situations may arise, however, which require that the MD5 key must be changed. For example, a MD5 key may need to be changed because of security concerns related to personnel changes (e.g. a network administrator leaving the company). In another example, if the BGP session is a long running session and is established between a BGP peer in an Internet Service Provider (ISP) network and a BGP peer in a customer network, it may be desirable to change the MD5 key periodically in order to prevent a potential attacker from guessing the key by sniffing and analyzing a large number of TCP segments sent over the TCP connection associated with the BGP session.

However, once the BGP session is established there is no practical way to change the MD5 key because BGP uses its own KEEPALIVE mechanism to detect whether the BGP session is active. BGP peers disable the TCP HoldTimer for the TCP connection, and use their own BGP KEEPALIVE HoldTimer, the value of which is negotiated during the establishing of the BGP session. A BGP peer would periodically send BGP KEEPALIVE messages to ensure that the HoldTimer on its BGP peer does not expire. For example, if the BGP peers negotiate the default BGP HoldTimer interval of 180 seconds, absent the exchange of any other BGP messages a BGP peer would send a BGP KEEPALIVE message every 60 seconds or so. If the BGP peer does not receive a communication over the BGP session within the BGP KEEPALIVE HoldTimer interval, it sends out a HoldTimer Expired Error and closes the BGP session.

Thus, if the MD5 key, which is used by a BGP peer in BGP session established over a TCP connection, needs to be changed, the key must be changed on both TCP endpoints within an interval of time that is smaller than the BGP HoldTimer. The interval of time during which the keys are changed on both TCP endpoints must be smaller than the BGP HoldTimer in order to prevent the TCP endpoint from silently discarding TCP segments signed with the old key that carry BGP messages of the BGP session. However, in a large network such as an ISP, it may be difficult to change the MD5 keys on all TCP endpoints that support BGP peers within an interval of time as small as a BGP HoldTimer interval.

Certain protocols such as BGP, RIP and IS-IS use timer-based synchronization to trigger key rollover for a session. However, all such existing key chaining mechanisms depend upon synchronization of the system clocks of the endpoints to accurately accomplish concurrent key rollover. If the clocks are not synchronized at both ends of a connection, password rollover may fail, resulting in a reset of the connection or session.

Another possible approach is to modify TCP to explicitly carry bits or fields that signal a change in MD5 keys. However, this approach requires specialized logic to interpret the signaling, and requires management of signaling messages at the endpoints.

Another possible approach is for a first endpoint to unilaterally change message authentication keys at any particular time, generate a message authentication tag based on the changed key, and send the message and message authentication tag to the second endpoint. If the second endpoint cannot authenticate the message based on a current key, the second endpoint changes key and tries again. If changing to a second key results in successful message authentication, then the second endpoint knows that the first endpoint has changed keys.

However, this approach is computationally expensive because a receiving endpoint must compute multiple authentication tags at each switchover. The endpoints also may have packets held in out-of-order buffers and must properly handle authentication of such packets with several keys. Further, a malicious user who injects a spoofed data segment into the network potentially can force endpoints to repeatedly compute multiple authentication tags.

The preceding approaches are illustrated, for example, in Mynam et al. I and Mynam et al. II, cited above.

Based on the foregoing, there is a clear need for techniques that overcome the disadvantages of the prior approach described above for preventing data injection attacks.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram showing a high-level overview of one embodiment of a method of switching transport protocol connection keys;

FIG. 2B is a flow diagram showing a high-level overview of example alternative approaches for determining whether to switch transport protocol connection keys;

DETAILED DESCRIPTION

Figure 1:
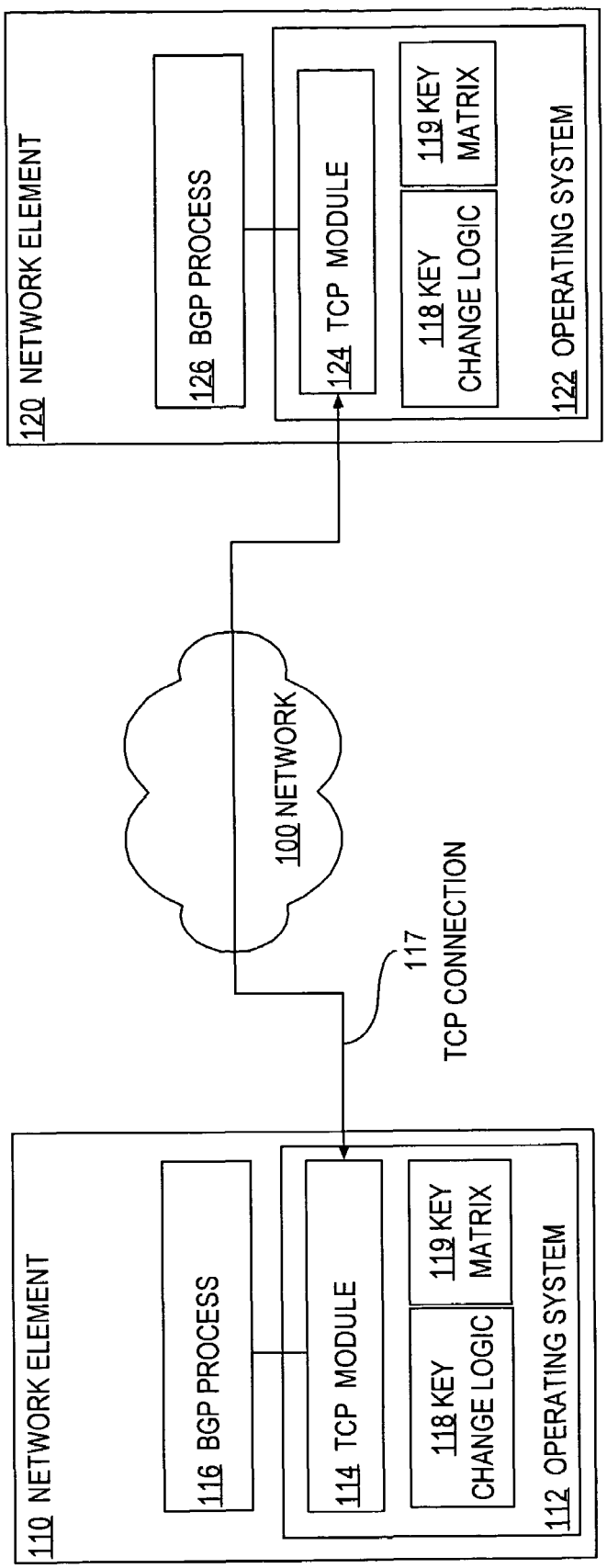
FIG. 1 is a block diagram that illustrates an operational context in which embodiments may be implemented.

Approaches for switching transport protocol connection keys are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Approach for Switching Transport Protocol Connection Keys
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for switching transport protocol keys comprising receiving and storing a plurality of passwords at a first endpoint of a connection established in a data communication network; selecting a first password for use in authenticating data segments on the connection; receiving a data segment on the connection from a second endpoint, wherein the data segment includes a sequence value that the second endpoint automatically increments; determining whether the sequence value matches a specified characteristic, and if so, selecting a next password among the plurality of passwords for use in authenticating subsequent data segments.

According to one feature of this aspect the specified characteristic is occurrence of a specified number of wraparounds of TCP sequence numbers. In another feature, the specified characteristic is a specified number greater than an initial sequence number that is received from the second endpoint. In still another feature, the specified characteristic is a specified multiple of an initial connection window size value.

In yet another feature, the connection is a transport control protocol (TCP) connection, and wherein the sequence value is a TCP sequence number. In a further feature, the first password and the next password are MD5 hash algorithm key values for performing hash-based message authentication of a TCP segment. In yet another feature, the connection is a Stream Transmission Control Protocol (SCTP) connection, and the sequence value is a SCTP Transmission Sequence Number (TSN).

According to another aspect, the invention provides a method of automatically changing a message authentication key at each of two endpoints of a connection in a telecommunications network, the method comprising the computer-implemented steps of receiving and storing a plurality of passwords at a first endpoint of a transport control protocol (TCP) connection established in the network; selecting a first password for use in authenticating data segments on the connection; receiving a TCP segment on the connection from a second endpoint, wherein the data segment includes a TCP sequence number that the second endpoint determined; determining whether the sequence number matches a specified characteristic, and if so, selecting a next password among the plurality of passwords for use in authenticating subsequent data segments. The specified characteristic is any one of: a particular number of wraparounds of TCP sequence numbers; a particular number greater than an initial sequence number that is received from the second endpoint; and a particular multiple of an initial connection window size value.

In still another aspect, the invention provides a method of automatically changing a message authentication key at each of two endpoints of a connection in a telecommunications network, the method comprising the steps of testing a sequence value received in each of a plurality of data segments on the connection; selecting a next message authentication key, from among a plurality of stored message authentication keys, for use in authenticating subsequently received data segments, when the sequence value matches a specified characteristic.

In other aspects, the invention encompasses a computer apparatus and a computer-readable medium configured to carry out the foregoing steps.

2.0 Structural Overview

FIG. 1 is a block diagram that illustrates an operational context in which embodiments of the approaches for switching transport protocol keys described herein may be implemented.

Network element 110 and network element 120 are communicatively connected over network 100. In FIG. 1, network elements 110 and 120 are routers each of which executes one or more BGP processes 116, 126. The approaches described herein, however, are not limited to being implemented on routers executing BGP processes, and the network elements and the processes that execute on them depicted in FIG. 1 are merely examples of one implementation approach.

Network element 110 includes operating system 112 that includes a TCP module 114, key change logic 118, and key matrix 119. Key change logic 118 comprises one or more computer program instructions or other software elements that implement the functions described herein. Key matrix 119 is a data structure that stores, in association, keys for performing message authentication operations, and characteristics for determining when to switch to a new key. In an embodiment, key change logic 118 may be integrated into TCP module 114.

Key change logic 118 and key matrix 119 are illustrated within operating system 112 solely to show one example implementation. Alternatively, key change logic 118 may comprise a separate application that the operating system hosts. Key matrix 119 may be stored in any location that is accessible to key change logic 118. The use of secure storage is appropriate, to prevent unauthorized users or applications from accessing passwords in the key matrix. The terms "key" and "password" have the same meaning in this description.

BGP process 116 runs logically on top of operating system 112 and utilizes the transport services provided by TCP module 114. Similarly, network element 120 includes operating system 122 that includes a TCP module 124. BGP process 126 runs on top of operating system 122 and utilizes the transport services provided by TCP module 124.

BGP process 116 on network element 110 and BGP process 126 on network element 120 have established a BGP session over TCP connection 117. TCP connection 117 is associated with two TCP endpoints represented respectively by TCP module 114 on network element 110 and by TCP module 116 on network element 120.

In one aspect of operation, upon the establishment of the BGP session, BGP process 116 configures TCP module 114 with a MD5 key, which is used by TCP module 114 to create MD5 signatures for, or to "sign", TCP segments that carry BGP messages to BGP process 126 over TCP connection 117. Similarly, BGP process 126 configures TCP module 124 with the same MD5 key, which is used by TCP module 124 to create MD5 signatures for TCP segments that carry BGP messages to BGP process 116 over TCP connection 117.

After the BGP session is established, when BGP process 116 decides to send a BGP message to BGP process 126, BGP process 116 communicates the BGP message to TCP module 114. TCP module 114 receives the contents of the message and, if necessary, breaks up the message for inclusion in the payload portion of one or more TCP segments. TCP module 114 then creates the one or more TCP segments, and, for each TCP segment, computes a MD5 signature by using the MD5 key previously provided by BGP process 116. The one or more TCP segments are transmitted to TCP module 124 over TCP connection 117, and placed in a re-transmission queue for the connection at TCP module 114 in case retransmission of the TCP segments is needed.

Upon receipt of the one or more TCP segments, TCP module 124 computes a MD5 digest for each segment by using its own version of the MD5 key for TCP connection 117. For each TCP segment, if the computed MD5 digest matches the MD5 signature included in the TCP segment, TCP module 124 validates the segment. TCP module 124 then assembles the original BGP message from the contents of the one or more received TCP segments, if necessary, and passes the message to BGP process 126.

BGP process 126 on network element 126 sends BGP messages over TCP connection 117 to BGP process 116 in network element 110 in an analogical manner.

The functions herein provide for periodically changing keys, such as MD5 keys, with which message signatures are determined. To support the functions described herein, key matrix 119 is provisioned to each of the network elements 110, 120 in a secure manner before the functions described herein become operational. The specific manner for provisioning key matrix 119 to the network elements is not critical, and applications (such as BGP processes 116, 126, or other applications) may implement any appropriate provisioning mechanism. What is important is that key matrix 119 is present on both network elements 110, 120 in identical form at some point before the key change techniques herein are initiated.

In one approach, an administrator is responsible to ensure that both endpoints to a connection are provisioned with the key matrix 119 and with key change logic 118 for implementing the techniques herein. This approach is appropriate in environments in which hash algorithm keys are otherwise exchanged offline.

Alternatively, a timeout approach may be used. In the timeout approach, when a sending endpoint determines a need to change keys, the sending endpoint starts using the new key for hashing data that is sent to the receiving end. If the sending endpoint fails to receive a reply from the receiving endpoint within a specified timeout period (e.g., a TCP timeout period, which typically is shorter than the BGP KEEPALIVE timeout value), then the sending endpoint assumes that the receiving endpoint could not authenticate the message or use the new key. In response, the sending endpoint returns to the previous key. This approach provides backward compatibility for the techniques herein.

In still another approach, endpoints may exchange BGP capability negotiation messages to inform one another that each endpoint can perform password switchover using the techniques herein.

In yet another approach, a specified TCP option value may indicate the use of the techniques herein.

Moreover, different embodiments may be implemented over a variety of connection-oriented or connectionless transport protocols, such as, for example, User Datagram Protocol (UDP), Stream Control Transmission Protocol (SCTP), and Datagram Congestion Control Protocol (DCCP). Furthermore, different embodiments of the approaches described herein may be implemented to provide transport protocol key switchover for a wide variety of upper-layer applications, such as, for example, LDP and Multicast Source Discovery Protocol. For this reason, the embodiments of the approaches described herein and the operational context depicted in FIG. 1 present examples, and embodiments are not limited to the context of FIG. 1.

3.0 Approach for Switching Transport Protocol Connection Keys

Generally, an approach herein for switching transport protocol connection keys at each of two endpoints of a connection in a telecommunications network comprises testing a sequence value received in each of a plurality of data segments on the connection. A next message authentication key is selected from among a plurality of stored message authentication keys for use in authenticating subsequently received data segments when the sequence value matches a specified characteristic. The sequence values increment at a sending point, automatically, through the ordinary operation of the transport protocol.

In essence, an endpoint observes sequence values of arriving segments of an active connection, and when the sequence values reach a particular value or match a particular characteristic, the endpoint automatically switches to another message authentication key. The other endpoint does the same.

Because both endpoints observe the same sequence values of the segments, which both endpoints either send or receive, the approach guarantees that key switchover occurs synchronously. No key change signaling or change in packet format is required; TCP implementations do not require any changes in the operation of the TCP protocol. Endpoints do not need to process multiple message authentication keys that are active at the same time during a switchover time interval, for example, when out-of-order packets are held in buffers. Double hashing of messages is not required. No connection reset is required upon a key change. Applications are not required to reset sessions when a key change occurs. No clock synchronization is required.

Figure 3:
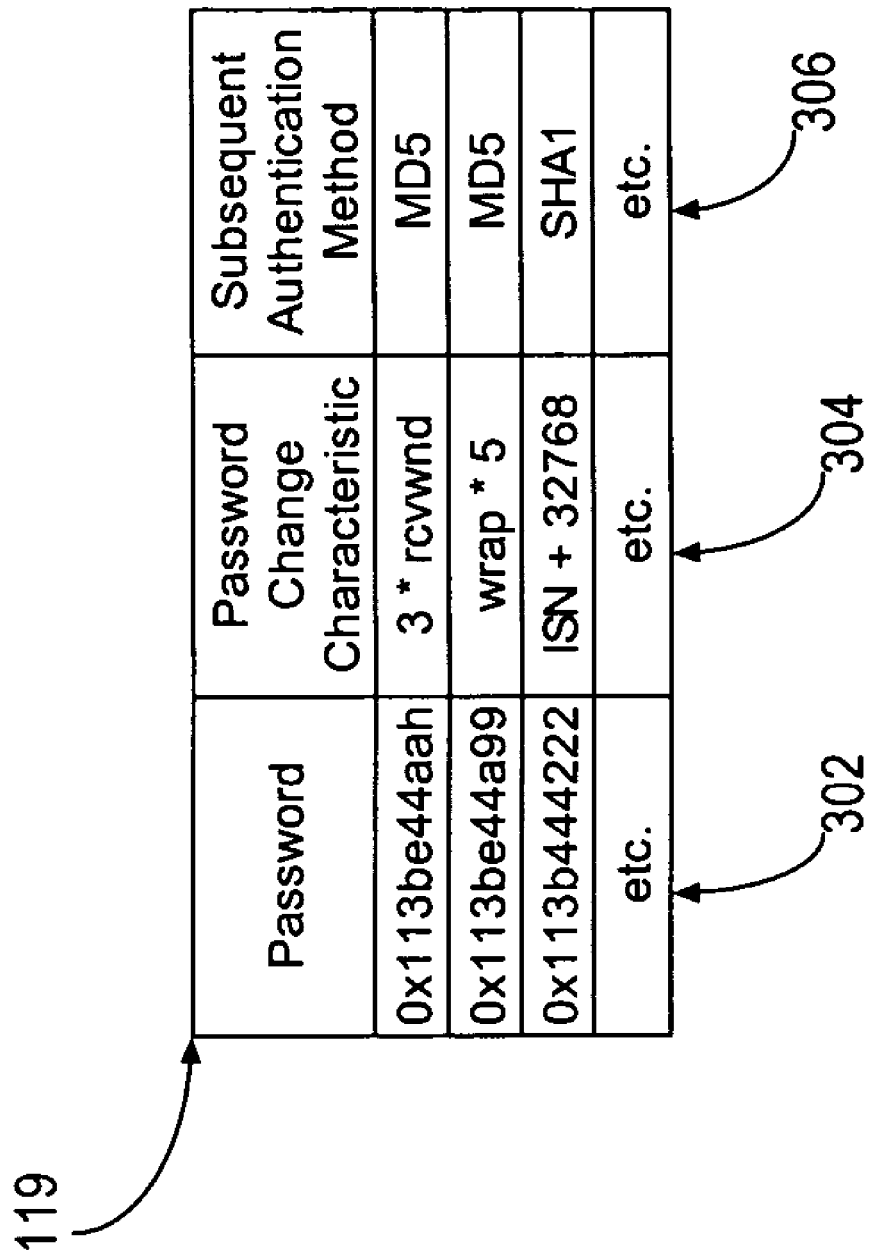
FIG. 3 is a block diagram of an example key matrix.

FIG. 2A is a flow diagram showing a high-level overview of one embodiment of a method of switching transport protocol connection keys; FIG. 2B is a flow diagram showing a high-level overview of example alternative approaches for determining whether to switch transport protocol connection keys. FIG. 3 is a block diagram of an example key matrix.

Referring first to FIG. 2A, in step 202, a configuration of message authentication keys and characteristics for causing key change is received. In one embodiment, step 202 involves an application provisioning key matrix 119 to each of the endpoints of a transport protocol connection. A user, such as a network administrator, may perform the provisioning. The provisioning may supply key matrix 119 to a plurality of routers, switches, or other network elements that may be involved in transport protocol connections in the future. Thus, the particular endpoints of a particular connection need not be known in advance. The provisioning is typically performed in a secure manner, for example, using encryption techniques to ensure that an unauthorized user or device cannot intercept and use the key matrix 119.

Various embodiments may use many different kinds of characteristics for causing key change. Generally, characteristics for causing key change depend on sequence values that are carried in segments of a transport protocol connection. For example, in one embodiment, a key change occurs when a sequence value in a received segment is equal to a specified multiple of an initial receive window size. In TCP parlance, the sequence value is n*rcvwnd.

Alternatively, a key change characteristic specifies a key change when the sequence value wraps around the maximum allowed sequence value number space a specified number of times. Thus, if a sequence value is represented in 16 bits having a maximum decimal value of $2^{16}$=65536, and the specified number of wraparounds is 3, then the key change characteristic would specify a key change to occur when the sequence value has incremented from 0 to 65535 three (3) times.

In another alternative, the key change characteristic specifies an offset from the initial sequence value. For example, in a TCP implementation, a key change characteristic could specify a key change when the TCP data segment sequence number reaches ISN+a specified value.

In still another alternative, the key change characteristic specifies a volume of data or number of bytes sent from an endpoint and acknowledged by the receiving endpoint. For example, an application may specify a particular number of bytes that is stored in association with a password in key change matrix 119. The specified number of bytes is converted to a particular sequence number at which a key change is required by computing an offset from the ISN.

For example, assume that in a TCP implementation the ISN is 10000, and that key change matrix 119 specifies a key change shall occur after 5000 bytes of data are exchanged. Thus, any TCP segment that has a starting sequence number greater than or equal to 15000 must use a new key. A TCP segment having a TCP sequence number of 14999 and a length of 100 bytes would still use the old key, whereas the next segment that starts with TCP sequence number 14999+100=15099 will start using the next key for message authentication.

Referring now to FIG. 3, an example embodiment of a key change matrix 119 is illustrated. Key change matrix 119 comprises any number of rows having columns 302, 304, 306 that associate passwords, password change characteristics, and optionally subsequent authentication methods, respectively. For example, the first row of key change matrix 119 specifies that the first message authentication password is "0x113be44aah," and that password should be changed to the next password in the matrix when the sequence value of the connection is equal to (3*rcvwnd), and when the password change occurs, the MD5 message authentication algorithm should be used with the next password. Successive rows of the example key change matrix associate other passwords with key changes based on 5 sequence value wraparounds occurring, and a specified offset from the ISN. Further, the last row specifies that the next authentication method should be SHA1 rather than MD5.

Specifying a different authentication method is optional and is not required in any particular embodiment. Further, alternative embodiments may associate other security mechanisms with a password change. For example, a key change matrix could specify that upon a password change, a combination of multiple security mechanisms should be used for subsequently received segments. The key change matrix could specify that an application should issue a notification or alert to a user, system or application when a key change occurs. An example notification could indicate that nearly all the keys in the key change matrix have been used, and a new key change matrix needs to be provisioned. Thus, the key change matrix provides a flexible profile for security on transport protocol connections.

In certain embodiments that use TCP, when an authentication method other than MD5 is specified, the TCP protocol may be modified to overload the present TCP MD5 option to use other authentication methods. The TCP MD5 option may be recast as a TCP security option that can carry a value identifying one of a plurality of authentication methods.

Referring again to FIG. 2A, in step 204, a first key is selected. Step 204 represents selecting the first key in a key change matrix at a particular endpoint. The other endpoint is assumed to concurrently select the same first key so that the endpoints are initially synchronized.

At step 206, a data segment is received. For example, a TCP data segment or an SCTP message containing a data chunk is received. In step 208, a sequence value is obtained from the received data segment. In a TCP implementation, step 208 represents identifying the sequence number carried in the received data segment. The sequence number could be the ISN that the other endpoint generated if the received data segment is the first segment of a connection, or could be an incremented sequence number that the other endpoint determined after successfully sending some acknowledged data to the first endpoint.

In step 210, the sequence value from the received data segment is compared to stored key change characteristics to determine if a match exists. For example, step 210 involves comparing a received TCP sequence number to the values of password change characteristic column 304 of key change matrix 119 (FIG. 3) to determine if the received sequence number matches any column value.

If a match occurs, then in step 214 the next key is selected. For example, for key change matrix 119 of FIG. 3, if the current password is "0x113be44aah," and the current received sequence number matches (3*rcvwnd), then the next password "0x113be44a99" is selected. At step 216, the selected key is used in computing an authentication value for the received message. Thus, if a match occurs at step 210, then at step 216 the newly selected password is used to compute a message authentication value for the received message to determine if the received message is genuine. If no match occurs, then the old password continues to be used at step 216.

In step 218, other appropriate data segment processing occurs. Control then transfers to step 206 to process other data segments in the same way.

At step 215, when a new key or password is selected, the process optionally selects other security characteristics as well. For example, a new authentication method may be selected from the key change matrix and used at step 216 in determining a message authentication value.

In this approach, the endpoints always remain synchronized with respect to the message authentication method that is currently in use. This occurs because the sending endpoint will always be the first endpoint to determine that the sequence value has matched a characteristic in the key change matrix, because the sending endpoint is accumulating the sequence values as it sends messages. Upon recognizing a match, the sending endpoint may switch to a new message authentication method, use that method to compute an authentication value, and send the newly computed authentication value with the message. The receiving endpoint then examines the received sequence value, also recognizes a match, switches to a new message authentication method, and therefore uses the correct new message authentication method to verify the received authentication value.

FIG. 2B shows further detail for flow steps of FIG. 2A using various example tests of characteristics for causing key change. For example, in one embodiment, after step 208, the test of step 210 of FIG. 2A may involve testing whether a received sequence value is equal to a specified multiple of TCP sequence number wraparounds, at step 210A. Alternatively, step 210 may involve determining whether a received sequence number is equal to a specified offset from an initial sequence number of a TCP connection, at step 210B. Further, a key change characteristic could specify a key change when the TCP data segment sequence number reaches a specified multiple of an initial receive window size, at step 210C. If any such test is true, based on a match with the key change matrix 119, then a next key is selected at step 214.

Certain sections herein refer to the use of MD5 as a message authentication method. Such references are intended only as example. Other embodiments may use any other message authentication method or encryption method, such as SHA1, UMAC-96, CMAC, etc.

Certain sections herein refer to the use of TCP as a transport protocol. Such references are intended only as example. Other embodiments may use any other connection-oriented communication protocol that uses sequence values for flow control or other purposes, such as SCTP.

4.0 Implementation Mechanisms—Hardware Overview

Figure 4:
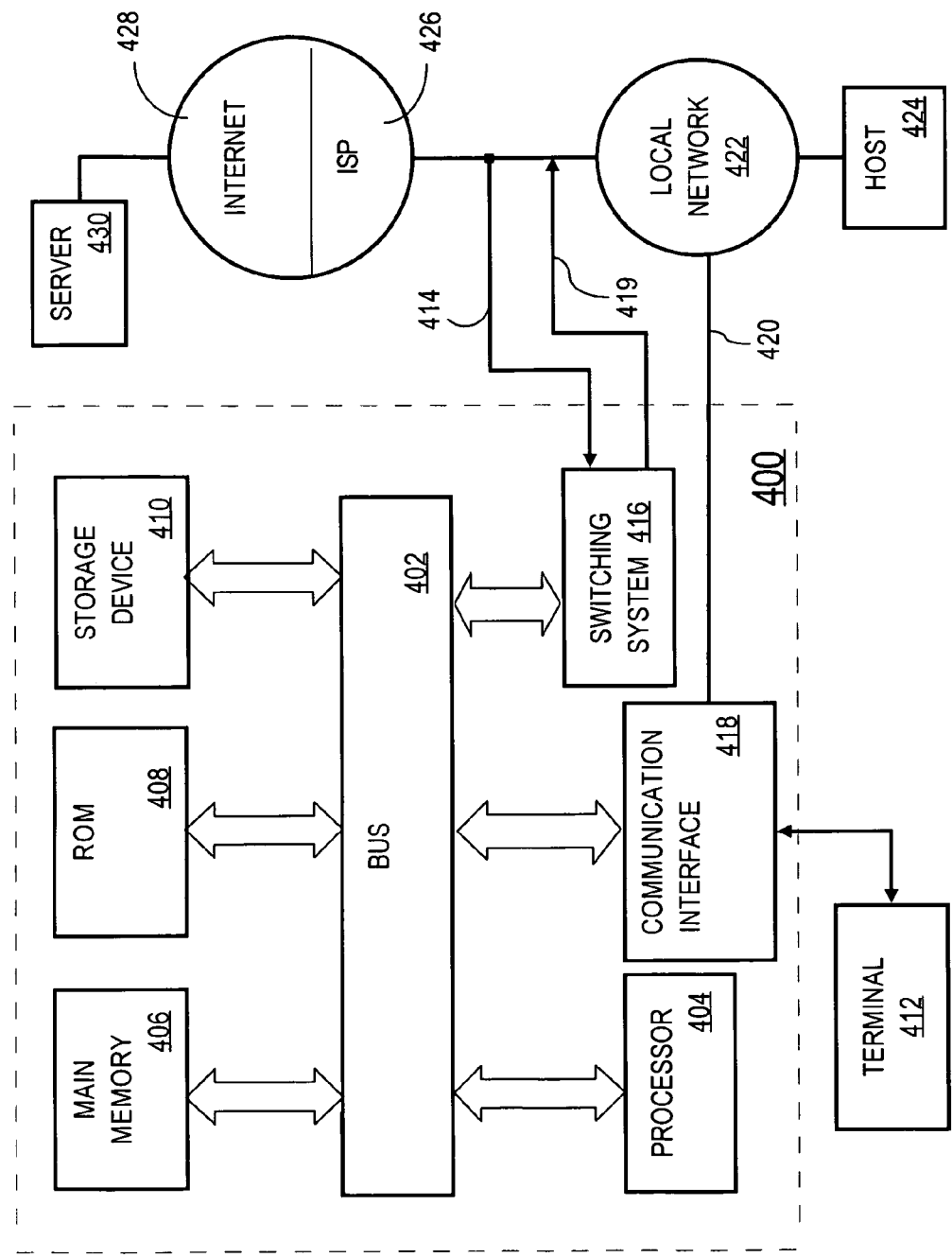
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for switching transport protocol connection keys. According to one embodiment of the invention, approaches for switching transport protocol connection keys are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line.

As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for switching transport protocol connection keys as described herein.

Processor 404 may execute the received code as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   receiving and storing a plurality of passwords at a first endpoint of a connection established in a data communication network before receiving a plurality of data segments;
   selecting a first password among the plurality of stored passwords for use in authenticating one or more first data segments on the connection, wherein the one or more first data segments are among the plurality of data segments;
   receiving a data segment on the connection from a second endpoint, wherein the data segment includes a sequence value that the second endpoint automatically increments, wherein the data segment is among the plurality of data segments;
   determining whether the sequence value matches a specified characteristic, and if so, selecting a next password among the plurality of stored passwords for use in authenticating subsequent data segments, wherein the subsequent data segments are among the plurality of data segments.

2. A method as recited in claim 1, wherein the specified characteristic is occurrence of a specified number of wraparounds of TCP sequence numbers.

3. A method as recited in claim 1, wherein the specified characteristic is a specified number greater than an initial sequence number that is received from the second endpoint.

4. A method as recited in claim 1, wherein the specified characteristic is a specified multiple of an initial connection window size value.

5. A method as recited in claim 1, wherein the connection is a transport control protocol (TCP) connection, and wherein the sequence value is a TCP sequence number.

6. A method as recited in claim 1, wherein the first password and the next password are hash algorithm key values for performing hash-based message authentication of a TCP segment.

7. A method as recited in claim 1, wherein the connection is a Stream Transmission Control Protocol (SCTP) connection, and the sequence value is a SCTP Transmission Sequence Number (TSN).

8. A method of automatically changing a message authentication key at each of two endpoints of a connection in a telecommunications network, the method comprising the computer-implemented steps of:
   receiving and storing a plurality of passwords at a first endpoint of a transport control protocol (TCP) connection established in the network before receiving a plurality of data segments;
   selecting a first password among the plurality of stored passwords for use in authenticating one or more first data segments on the connection, wherein the one or more first data segments are among the plurality of data segments;
   receiving a data segment on the connection from a second endpoint, wherein the data segment includes a TCP sequence number that the second endpoint determined, wherein the data segment is among the plurality of data segments;
   determining whether the sequence number matches a specified characteristic, and if so, selecting a next password among the plurality of stored passwords for use in authenticating subsequent data segments, wherein the subsequent data segments are among the plurality of data segments;
   wherein the specified characteristic is any one of: a particular number of wraparounds of TCP sequence numbers; a particular number greater than an initial sequence number that is received from the second endpoint; and a particular multiple of an initial connection window size value.

9. A method of automatically changing a message authentication key at each of two endpoints of a connection in a telecommunications network, the method comprising the steps of:
   testing a sequence value received in each of a plurality of data segments on the connection, wherein one or more data segments are authenticated using a first authentication key among a plurality of stored message authentication keys;
   selecting a next message authentication key, among a plurality of stored message authentication keys, for use in authenticating subsequently received data segments, when the sequence value matches a specified characteristic;
   wherein the subsequently received data segments are after the one or more data segments and wherein the plurality of stored message authentication keys are established in the network before receiving a plurality of data segments.

10. A method as recited in claim 9, wherein the specified characteristic is occurrence of a specified number of wraparounds of TCP sequence numbers.

11. A method as recited in claim 9, wherein the specified characteristic is a specified number greater than an initial sequence number that is received from the second endpoint.

12. A method as recited in claim 9, wherein the specified characteristic is a specified multiple of an initial connection window size value.

13. A method as recited in claim 9, wherein the connection is a transport control protocol (TCP) connection, and wherein the sequence value is a TCP sequence number.

14. A method as recited in claim 9, wherein the first password and the next password are hash algorithm key values for performing hash-based message authentication of a TCP segment.

15. A method as recited in claim 9, wherein the first password and the next password are MD5 hash algorithm key values for performing hash-based message authentication of a TCP segment.

16. A method as recited in claim 9, wherein the connection is a Stream Transmission Control Protocol (SCTP) connection, and the sequence value is a SCTP Transmission Sequence Number (TSN).

17. An apparatus configured for automatically changing a message authentication key at endpoints of a connection in a telecommunications network, the apparatus comprising:
  means for testing a sequence value received in each of a plurality of data segments on the connection, wherein one or more data segments are authenticated using a first authentication key among a plurality of stored message authentication keys;
  means for selecting a next message authentication key, among a plurality of stored message authentication keys, for use in authenticating subsequently received data segments, when the sequence value matches a specified characteristic;
  wherein the subsequently received data segments are after the one or more data segments and
  wherein the plurality of stored message authentication keys are established in the network before receiving a plurality of data segments.

18. An apparatus as recited in claim 17, wherein the specified characteristic is occurrence of a specified number of wraparounds of TCP sequence numbers.

19. An apparatus as recited in claim 17, wherein the specified characteristic is a specified number greater than an initial sequence number that is received from the second endpoint.

20. An apparatus as recited in claim 17, wherein the specified characteristic is a specified multiple of an initial connection window size value.

21. An apparatus as recited in claim 17, wherein the connection is a transport control protocol (TCP) connection, and wherein the sequence value is a TCP sequence number.

22. An apparatus as recited in claim 17, wherein the first password and the next password are hash algorithm key values for performing hash-based message authentication of a TCP segment.

23. An apparatus as recited in claim 17, wherein the first password and the next password are MD5 hash algorithm key values for performing hash-based message authentication of a TCP segment.

24. An apparatus as recited in claim 17, wherein the connection is a Stream Transmission Control Protocol (SCTP) connection, and the sequence value is a SCTP Transmission Sequence Number (TSN).

25. An apparatus configured for automatically changing a message authentication key at endpoints of a connection in a telecommunications network, the apparatus comprising:
  a processor;
  a network interface coupled to the processor and coupled to the network for receiving packet flows therefrom;
  a nonvolatile or volatile computer-readable medium coupled to the processor and comprising one or more stored sequences of instructions which, when executed by the processor, cause the processor to perform the steps of:
  testing a sequence value received in each of a plurality of data segments on the connection, wherein one or more data segments are authenticated using a first authentication key among a plurality of stored message authentication keys;
  selecting a next message authentication key, from among a plurality of stored message authentication keys, for use in authenticating subsequently received data segments, when the sequence value matches a specified characteristic; wherein the subsequently received data segments are after the one or more data segments and wherein the plurality of stored message authentication keys are established in the network before receiving a plurality of data segments.

26. An apparatus as recited in claim 25, wherein the specified characteristic is occurrence of a specified number of wraparounds of TCP sequence numbers.

27. An apparatus as recited in claim 25, wherein the specified characteristic is a specified number greater than an initial sequence number that is received from the second endpoint.

28. An apparatus as recited in claim 25, wherein the specified characteristic is a specified multiple of an initial connection window size value.

29. An apparatus as recited in claim 25, wherein the connection is a transport control protocol (TCP) connection, and wherein the sequence value is a TCP sequence number.

30. An apparatus as recited in claim 25, wherein the first password and the next password are hash algorithm key values for performing hash-based message authentication of a TCP segment.

31. An apparatus as recited in claim 25, wherein the first password and the next password are MD5 hash algorithm key values for performing hash-based message authentication of a TCP segment.

32. An apparatus as recited in claim 25, wherein the connection is a Stream Transmission Control Protocol (SCTP) connection, and the sequence value is a SCTP Transmission Sequence Number (TSN).

* * * * *